United States Patent

Matsushima

[15] 3,649,777

[45] Mar. 14, 1972

[54] SUPERVISORY APPARATUS FOR PCM REGENERATIVE REPEATERS

[72] Inventor: Takao Matsushima, Tokyo, Japan

[73] Assignee: Nippon Electric Company, Limited, Tokyo, Japan

[22] Filed: Apr. 21, 1969

[21] Appl. No.: 817,840

[30] Foreign Application Priority Data

Apr. 26, 1968 Japan....................................43/28130

[52] U.S. Cl. ......................................................179/175.31R
[51] Int. Cl. ..........................................................H04b 1/60
[58] Field of Search ...........179/15 AP, 175.31, 15 AL, 15 T, 179/16.4, 16 E, 175.31 R

[56] References Cited

UNITED STATES PATENTS

| | | | |
|---|---|---|---|
| 3,062,927 | 11/1962 | Hamori | 179/175.31 |
| 3,083,270 | 3/1963 | Mayo | 179/175.31 |

*Primary Examiner*—Kathleen H. Claffy
*Assistant Examiner*—Randall P. Myers
*Attorney*—Marn & Jangarathis

[57] ABSTRACT

Supervisory apparatus is provided in accordance with this invention for monitoring or supervising the operation of the repeater means present in a PCM transmission system wherein the transmitted information comprises a unipolar waveform. According to one embodiment of the present invention, select frequency components of differing character are assigned to each of the repeater means disposed along a common information transmission path present within the PCM transmission system. The supervisory apparatus provided in this embodiment of the present invention includes a supervisory transmission path adapted for the transmission of each of such select frequency components from said repeater means to a terminal portion of said PCM transmission system, supervisory circuit means interposed between each of said repeater means and said supervisory transmission path for applying only a specifically assigned one of such select frequency components from the repeater means connected thereto to said supervisory transmission path and means for selectively applying a unipolar supervisory signal to each of said repeater means disposed along said common information transmission path. The means for selectively applying a unipolar supervisory signal to each of said repeater means is adapted to produce a unipolar supervisory signal which is binary in nature and characterized by a waveform wherein the relative ratio of the duration of the segments thereof representing each binary state is varied to form at least two slowly varying frequency component. Such slowly varying frequency component comprises one of the select frequency components assigned to each of said repeater means and said unipolar supervisory signal may be produced in a manner so that each of such select frequency components is provided to said repeater means and readily discriminated. Accordingly, the remote detection of such select frequency components as present in said supervisory transmission path is determinative of the operating condition of the repeater means being supervised.

7 Claims, 9 Drawing Figures

Figure 1:
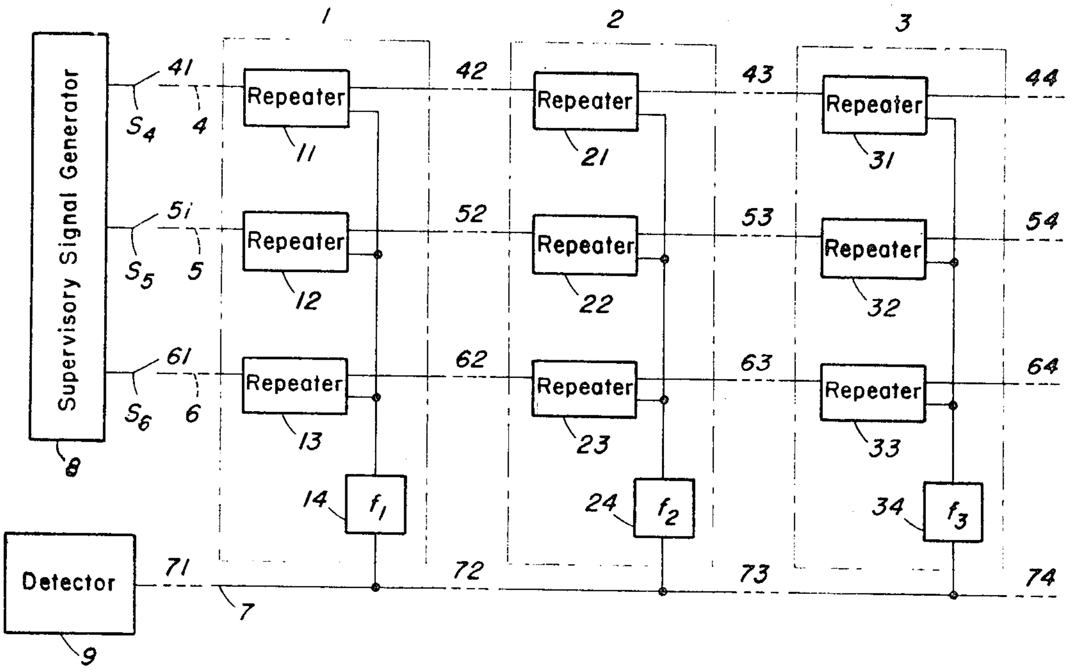

INVENTOR.
Takao Matsushima
BY
Marn & Jangarathis
ATTORNEYS

INVENTOR.
Takao Matsushima

BY
Marn & Jangarathis
ATTORNEYS

INVENTOR.
TAKAO MATSUSHIMA

SUPERVISORY APPARATUS FOR PCM REGENERATIVE REPEATERS

This invention relates to PCM transmission systems and more particularly to supervisory apparatus for detecting faulty operation in the repeater means utilized therein.

Present day PCM transmission systems generally comprise one or more PCM information paths which each include a plurality of regenerative repeater means spaced therealong at predetermined intervals. The PCM information paths may take the form of transmission lines, space through which radiant energy will propagate, or combinations of each of the foregoing media while the precise form of the plurality of regenerative repeater means relied upon will vary depending upon the nature of the information path in which they reside. Similarly, the spacing between the respective regenerative repeater means in a given information transmission path will be governed by the design criteria of the PCM transmission system involved and the transmission media under consideration, so that each of such regenerative repeater means therein may, with propriety, accomplish its basic functions of reshaping, retiming and regeneration. Thus, in the well-known manner, the regenerative repeater means present in a given information transmission path act to receive, regenerate and retransmit the PCM information propagating in such transmission path.

Regenerative repeater means relied upon in practical PCM transmission systems currently in use are very often physically located in manholes or on telephone poles so that they may be conveniently positioned along their respective transmission paths. However, this form of convenient positioning, as well as the manner in which the regenerative repeater means are spaced along their respective transmission paths, renders it highly difficult to supervise or monitor the operation of such individual regenerative repeater means at their respective sites. Accordingly, the regenerative repeater means present in transmission systems in general and PCM transmission systems in particular are largely unattended and must be supervised or monitored from convenient central locations or from the ends of the transmission system under consideration. Therefore, it has been common practice to provide such conventional PCM transmission systems with supervisory apparatus which are operative from a transmitting terminal or other remote location in the PCM transmission system to detect and isolate the location of regenerative repeater means utilized therein whose operation is faulty or in which a failure has occurred.

One well-known, conventional form of supervisory apparatus for PCM communications systems using bipolar codes, as described in U.S. Pat. No. 3,083,270, which issued to J. S. Mayo on Mar. 26, 1963, utilizes the so called "pulse trio signal". This form of supervisory apparatus relies upon the characteristic absence of low-frequency spectrum components in bipolar coded information to provide and insert into the transmission path of the PCM transmission system supervisory signals which comprise "pulse trio signals" having specified, predetermined low-frequency spectrum components so that a different one of such low-frequency spectrum components may be assigned to each of the repeater locations along the transmission path. Each of the repeater locations is provided with means to selectively remove the low-frequency component assigned thereto from the signal applied and regenerated thereby and means to return such low-frequency component to the point in the transmission path whereat the supervisory signal containing such low-frequency component was inserted. Thus, the supervisory signals containing the specified, predetermined low-frequency spectrum components are inserted into the transmission path one at a time so that the location of faulty repeater means may be detected from the end of the repeatered line, assuming this to be the point of detection, by the failure of the low-frequency spectrum components assigned to a given repeater site to return to the point of insertion after the requisite supervisory signal has been applied thereto. However, although conventional supervisory apparatus such as the foregoing "pulse trio signal" supervisory apparatus have proven highly satisfactory for PCM transmission systems using bipolar codes, these forms of supervisory apparatus are not applicable to PCM transmission systems wherein the transmitted signal is composed of two states, for example of amplitude or phase, the transition of which corresponds to the occurrence of a "1" or a "0" in an original binary code sequence that was unipolar. This form of transmitted signal is hereinafter referred to as a unipolar differential code and when such a unipolar differential code is employed as the transmitting code format, the form of the information conveyed by the requisite transmission path is substantially different from the case in which a bipolar code is employed. This position is taken because when a unipolar differential code is employed as the transmitting code format, the unipolar information transmitted in the transmission path includes its own low-frequency components. Thus, before the location of a repeater site containing faulty regenerative repeater means could be ascertained using a form of supervisory apparatus similar to the above, wherein the so called "pulse trio signal" having low-frequency spectrum components was relied upon, some means capable of effectively discriminating the specific low-frequency spectrum components present in the supervisory signals from those inherent in information transmitted according to the unipolar code format would of necessity have to be developed. Accordingly, as PCM transmission systems using a unipolar differential code as the transmitting code format do not readily admit of use with supervisory apparatus designed to take advantage of a characteristic of bipolar coded information, not inherent therein, such supervisory apparatus is not currently available for the remote detection of a failure or the faulty operation of the repeater means utilized therein.

Therefore, it is a principal object of the present invention to provide supervisory apparatus for the repeater means employed in a PCM transmission system using a unipolar differential code as the transmitting code format. Other objects and advantages of this invention will become clear from the following detailed description of several exemplary embodiments thereof, and the novel features will be particularly pointed out in conjunction with the appended claims.

Figure 2A:
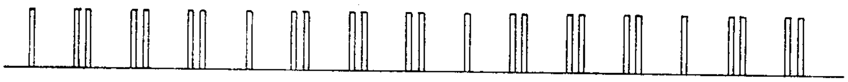
Figure 2B:
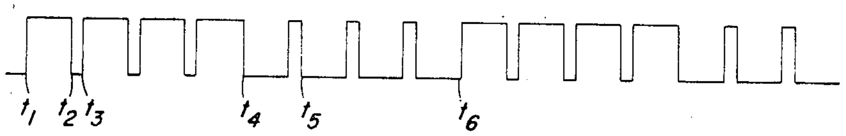
Figure 2C:
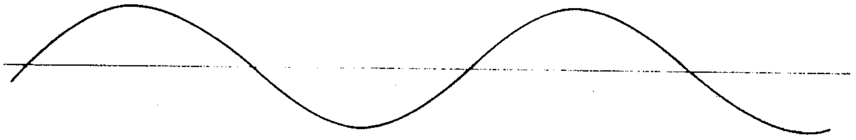
Figures 3A, 3B, 3C, 3D:
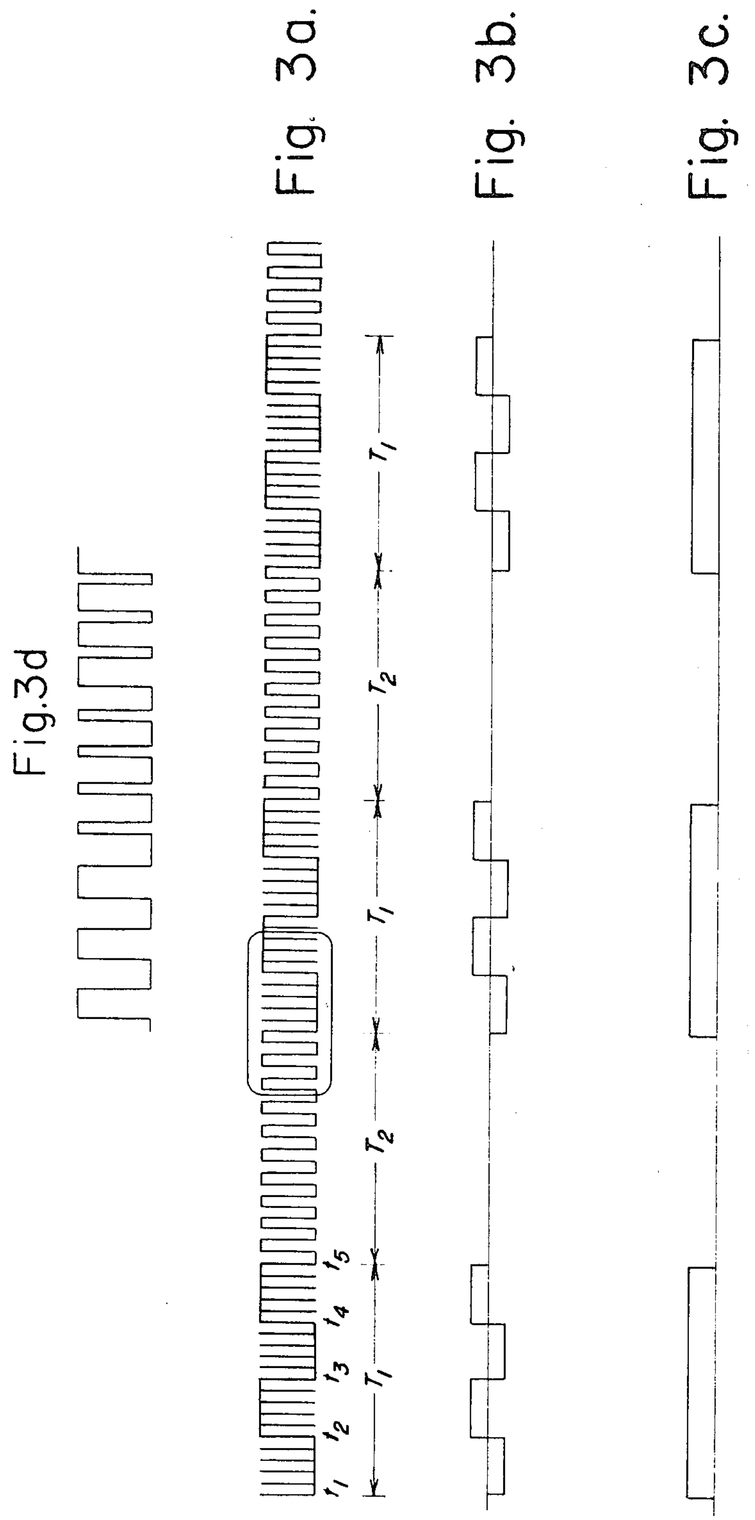
Figure 4:
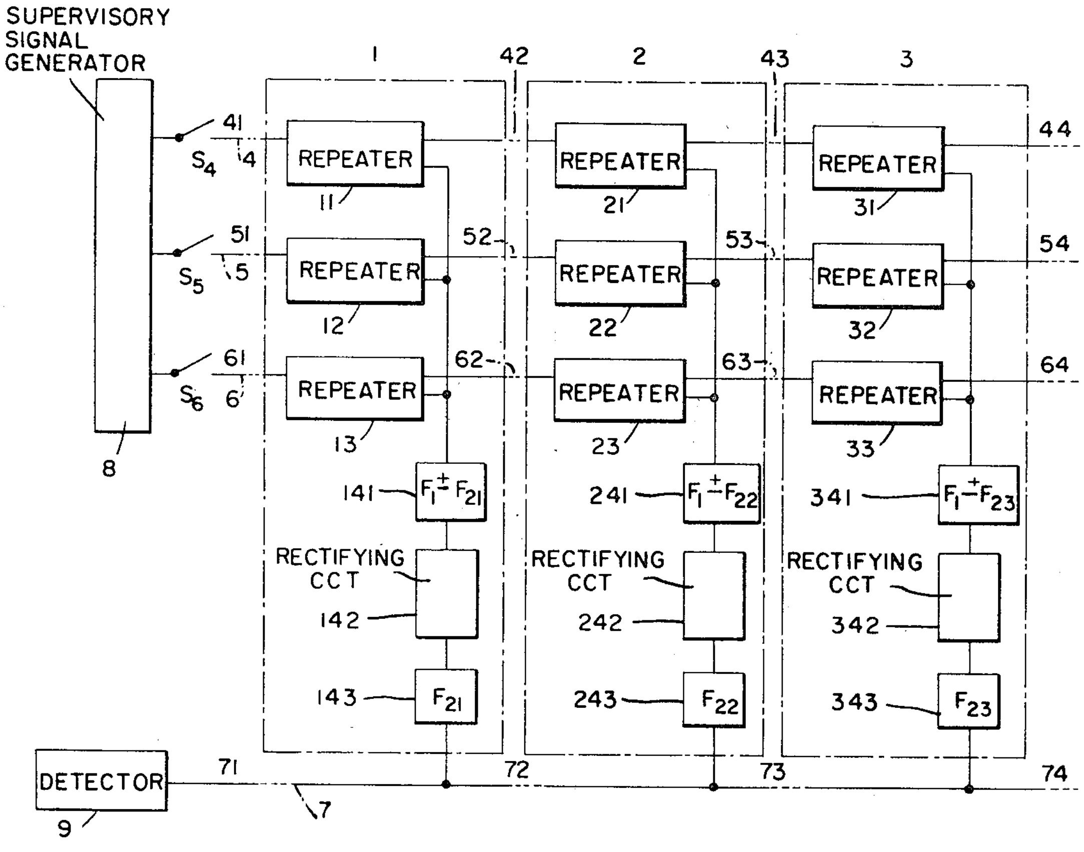

In accordance with this invention supervisory apparatus for detecting faults in repeater means present in a PCM transmission system using a unipolar differential code as the transmitting code format is provided wherein said supervisory apparatus includes a supervisory transmission path, supervisory circuit means interposed between each of said repeater means and said supervisory transmission path for applying only a specifically assigned frequency component which may be present in the output of the repeater means associated therewith to said supervisory transmission path and means for applying a unipolar supervisory signal to said PCM transmission system, said unipolar supervisory signal being characterized in that it is binary in nature and has a relative ratio between the time periods occupied by the pulses representing each binary state thereof so that at least one of said specifically assigned frequencies is contained within said unipolar supervisory signal, whereby said unipolar supervisory signal is applied to each of said repeater means present in said PCM transmission system and the proper operation of each of said repeater means may be ascertained at a common location by the determination of the presence or absence of the specifically assigned frequency components in said supervisory transmission path. The invention will be more clearly understood by reference to the following detailed description of several exemplary embodiments thereof in conjunction with the accompanying drawings in which:

FIG. 1 is a schematic illustration of a portion of a PCM transmission system employing an example of the supervisory apparatus;

FIGS. 2A–2C illustrate one form of a unipolar supervisory signal usable in the example of the supervisory apparatus illustrated in conjunction with FIG. 1 wherein FIG. 2A is an ordinary unipolar waveform having a given information content; FIG. 2B shows a supervisory signal for use in the supervisory apparatus, corresponding in information content to the waveform of FIG. 2A; and FIG. 2C illustrates a slowly varying frequency component present in the supervisory signal of FIG. 2B;

FIGS. 3A–3D illustrate a form of a unipolar supervisory signal usable in the exemplary embodiment of the supervisory apparatus according to this invention wherein FIG. 3A shows the supervisory signal per se, FIG. 3B shows the mean value of a slowly varying frequency component present in the waveform of FIG. 3A, FIG. 3C shows the waveform of FIG. 3B after suitable rectification, and FIG. 3D shows an enlarged view of the encircled portion of the waveform in FIG. 3A; and FIG. 4 is a schematic illustration of a portion of a PCM transmission system employing an embodiment of the supervisory apparatus according to the present invention.

Referring now to the drawings, and more particularly to FIG. 1 thereof, there is shown a block diagram illustrating a portion of a PCM transmission system employing an example of the supervisory apparatus. As shown in FIG. 1, the illustrated portion of the PCM transmission system includes supervisory signal generator means 8, a plurality of information transmission paths 4–6, a plurality of repeater stations 1–3 spaced therealong, a supervisory transmission path 7 linking each of said plurality of repeater stations 1–3 and detector means 9. For the purposes of simplifying the present disclosure of the instant example, the PCM transmission system of which a portion is shown in FIG. 1 is illustrated as including only three information transmission paths 4–6; however, as is well known to those of ordinary skill in the art, the number of information transmission paths provided in such a PCM transmission system will be a function of the system requirements determined by the total information to be carried and the amount of information transmittable in each of said transmission paths. The supervisory signal generator means 8 is remotely located at an end terminal location of the portion of the PCM transmission system illustrated in FIG. 1 and is adapted as indicated by the switch means $S$ –$S_6$ connected thereto to be selectively connected to each of the transmission paths 4–6 present in the depicted portion of the PCM transmission system. The supervisory signal generator means 8 may take the form of any circuit means capable of generating a unipolar supervisory signal taking one of several specified waveforms which shall be discussed in detail hereafter with regard to the waveforms illustrated in FIGS. 2B and 3A and further varying such waveforms in a manner which is also described in conjunction with FIGS. 2A–2C and 3A–3C so that certain predetermined frequency components will be present therein. The repeater stations 1–3 are, in the usual manner, disposed at suitable intervals along the transmission path 4–6 of the illustrated portion of the PCM transmission system and, in order to facilitate a clearer understanding of the present example, the portions of the transmission paths 4–6 connected to and residing intermediate the respective repeater stations 1–3 have been annotated with additional reference numerals indicative of their position with respect to such repeater stations 1–3. Thus, each of said transmission paths bear reference numerals wherein the tens digit thereof indicates the transmission path while the units digit thereof indicates the position of the annotated portion of the transmission path with respect to the repeater stations 1–3. Therefore, it will be seen, that transmission path 4 is divided into portions 41–44 wherein portion 41 is connected to repeater station 1, portion 42 is connected intermediate repeater stations 1 and 2, portion 43 is connected intermediate repeater stations 2 and 3 and portion 44 is connected to repeater station 4 while similar notation has been adopted with respect to transmission paths 5 and 6 as well as the supervisory transmission path 7. In addition, to further simplify the present disclosure, only transmission paths directed for information transmission from left to right have been shown; however, as shall be obvious to those of ordinary skill in the art from the discussion set forth below, this system, due to its symmetrical nature, is fully applicable to PCM transmission systems adapted for bidirectional information transmission.

As the illustrated portion of the PCM transmission system has been depicted in FIG. 1, for the reasons aforesaid, as including three transmission paths 4–6, each of the repeater stations 1–3 is illustrated as comprising three individual repeater means associated therewith and an appropriate row and column numbering system has been adopted therefor so that the reference numeral identifying each of such repeater means indicates at the tens digit thereof the repeater station in which it resides and at the units digit thereof the row position within the respective repeater station which it occupies and hence the transmission path associated therewith. Thus, the repeater station 1 includes repeater means 11–13 which are connected to the transmission paths 4–6, respectively, the repeater station 2 includes repeater means 21–23 connected to the transmission paths 4–6, respectively and the repeater station 3 includes repeater means 31–33 connected to the transmission paths 4–6 respectively. The repeater means 11–13, 21–23 and 31–33 illustrated in FIG. 1 may take the form of conventional regenerative repeater means commonly used in PCM transmission systems to reshape, retime and regenerate the information received thereby and act in the well known manner to retransmit the information applied thereto after these three basic functions have been accomplished therein. Each of the repeater means 11–13, 21–23 and 31–33 includes at least one input means and at least first and second output means wherein each of said input means and said first output means connect each of said repeater means 11–13, 21–23 and 31–33 into the transmission path associated therewith in the manner illustrated in FIG. 1. The second output means of each of the repeater means 11–13, 21–23 and 31–33 present in each of said repeater stations 1–3 is connected in common to supervisory circuit means 14, 24 and 34, respectively, also present in each of said repeater stations 1–3. The repeater means 11–13, 21–23 and 31–33 are thus each adapted to receive PCM signals propagating in the portion of the transmission path connected to the input means present therein and retransmit such information at the first output means thereof to the adjacent portion of the transmission path associated therewith. In addition, each of the repeater means 11–13, 21–23 and 31–33 present in each of said repeater stations 1–3 are commonly connected at the second output means thereof to the supervisory circuit means 14, 24 and 34, respectively, located thereat and hence each of said supervisory circuit means 14, 24 and 34 are adapted to receive a portion of the output of each of the repeater means 11–13, 21–23 and 31–33, respectively, connected in common therewith. Thus, when supervisory signals are present in a given transmission path 4–6, such supervisory signals will be received and retransmitted by each of the repeater means 11–31, 12–32, and 13–33 associated with such transmission path 4–6 and additionally applied by the second output means of said repeater means 11–31, 12–32 and 13–33 to the supervisory circuit means 14, 24 and 34 present in each of the repeater stations 1–3.

The supervisory circuit means 14, 24 and 34 take the form of circuit means adapted to pass only such portions of an input signal applied thereto as are equal in frequency to the specific frequency component assigned to each of said supervisory circuit means 14, 24 and 34 and hence the repeater station 1–3 in which said supervisory circuit means reside. Thus, as shall be seen hereinafter, each of the supervisory circuit means 14, 24 and 34 may take the form of conventional filter means having a specifically designated pass frequency, indicated as $F_1$–$F_3$ in FIG. 1. The output of each of the supervisory circuit means 14, 24, and 34 as present in each of said repeater stations 1–3, respectively, are connected at the outputs thereof to the supervisory transmission path 7 so that, the specifically designated frequency components applied thereto by said supervisory circuit means 14, 24, and 34 are returned thereby by in a direction from right to left toward the terminal portion of the PCM transmission system whereat said supervisory signals were inserted and hence applied to the detector means 9. The detector means 9 may take the form of any conventional circuit means capable of discriminating the input signals applied thereto and detecting the presence of the specific frequency components therein. As shall be seen below, the specifically assigned frequency components present in the supervisory signal and passed by the supervisory circuit means 14, 24 and 34 to the supervisory transmission path 7 are in a form which may be easily detected by the detector means 9 and therefore a determination as the presence or absence of such specifically assigned frequency components in the supervisory transmission path 7 may be easily made.

The operation of the supervisory apparatus according to the present invention may be best explained by initially assuming that the operation of one of the repeater means 11–13, 21–23 and 31–33 illustrated in FIG. 1 is to be supervised so that a determination as to the presence of proper or faulty operation of said one repeater means 11–13, 21–23 and 31–33 can be made. Thus, if it is recalled that a predetermined frequency component $F_1$–$F_3$ is assigned to each of the repeater stations 1–3, respectively, and it is assumed that the operation of repeater means 22 is to be supervised, in the operation of the instant embodiment of the supervisory apparatus according to the present invention, the switch means $S_5$ will be closed while switch means $S_4$ and $S_6$ are retained in the opened condition illustrated and the supervisory signal generator means 8 will apply a unipolar supervisory signal containing the requisite frequency components $F_2$ to the transmission path 5. As some of the precise waveforms which said unipolar supervisory signal may take are discussed in detail in conjunction with FIGS. 2A–2C and 3A–3C, it is sufficient at this point to merely appreciate that the unipolar supervisory signal applied to a given transmission path 4–6 to supervise or monitor the operation of a selected repeater means 11–13, 21–23 and 31–33 contains the predetermined frequency component assigned to such selected repeater means 11–13, 21–23 and 31–33 and thus the frequency component assigned to the repeater station 1–3 in which said selected repeater means 11–13, 21–23 and 31–33 resides. The supervisory signal produced by the supervisory signal generator means 8 to supervise the operation of repeater means 22 will be applied through the closed switch means $S_5$ and the portion of the transmission path 52 to the input means of the repeater means 12 as present in the repeater station 1. If it is further assumed that the repeater means 12 is operating properly, the supervisory signal applied thereto will be present at each of the first and second outputs thereof. The portion of the supervisory signal thus present at the second output of the repeater means 12 will be applied to the input of the supervisory circuit means 14 present at the repeater station 1 and commonly coupled to each of the second outputs of the repeater means 11–13 present therein. However, as described above, since the supervisory signal generated for the purposes of supervising the operation of repeater means 22 includes a specified frequency component $F_2$ but does not contain a specified frequency component $F_1$, the portion of the supervisory signal present at the second output of the repeater means 12 and applied to the supervisory circuit means 14 will be blocked or attenuated by the supervisory circuit means 14 so that no output signal will be applied thereby to the supervisory transmission path 7.

The portion of the supervisory signal present at the first output of the repeater means 12 will be transmitted over the portion of the transmission path 52 which resides between repeater stations 1 and 2 and will thus be received at the input of the repeater means 22 present at the repeater station 2. If it is here assumed that the repeater means 22 is functioning in its normal manner, the supervisory signal applied thereto will be present at each of the first and second outputs thereof. The portion of the supervisory signal present at the second output of the repeater means 22 sill be applied to the input of the supervisory circuit means 24 present at the repeater station 2, which supervisory circuit means 24, as aforesaid, is commonly connected to each of the second outputs of the repeater means 21–23 present therein. As the portion of the supervisory signal present at the second output of the repeater means 22 contains the specific frequency component $F_2$ assigned to the supervisory circuit means 24 and the repeater station 2, the supervisory circuit means 24 will pass this specifically assigned frequency component, in the well-known manner, and produce an output signal representative of such specifically assigned component. The output signal of the supervisory circuit means 24 is applied to the supervisory transmission path 7 and is coupled thereby, through portions 72 and 71 thereof to the detector means 9. The detector means 9 then acts in the manner aforesaid to discriminate the end of the supervisory transmission path 7 and under these conditions determines the presence of a signal which includes the frequency component $F_2$ assigned to the repeater station 2.

Accordingly, when the detector means 9 determines the presence of a signal which includes the frequency component $F_2$, the proper operation of the repeater means 22 is thereby indicated. As will be apparent from the operation of the supervisory circuit means 24, discussed above, if the repeater means 22 presently under consideration has failed or if a fault has occurred therein such that a portion of the supervisory signal containing the specifically assigned frequency component is not produced at the second output thereof, no frequency component will be passed by the supervisory circuit means 24, no output signal will be produced by said supervisory circuit means 24 representative of said specifically assigned frequency $F_2$, and the detector means 9 will indicate an absence of the specifically assigned frequency $F_2$ and a fault or failure in the operation of the repeater means 22.

When the repeater means 22 is operating properly under the above-stated conditions, the supervisory signal applied thereto will also be present at the first output means thereof. The portion of the supervisory signal present at the first output of the repeater means 22 will be coupled over the portion of the transmission path 53 which resides between repeater stations 2 and 3 and therefor will be applied to the input of the repeater means 32 present at the repeater station 3. If it is also assumed that the repeater means 32 is operating properly, the supervisory signal applied thereto will be present at each of the first and second outputs thereof. The portion of the supervisory signal present at the second output of the repeater means 32 will be applied to the input of the supervisory circuit means 34 which connects to each of the second outputs of the repeater means 31–33 present at the repeater station 3. However, since the supervisory signal generated for the purposes of supervising the operation of the repeater means 22 does not include the specified frequency component $F_3$ assigned to the repeater station 3 and the supervisory circuit means 34, the portion of the supervisory signal present at the second output of the repeater means 32 and applied to the supervisory circuit means 34 will be blocked and hence no output signal is applied by said supervisory circuit means 34 to the supervisory transmission path 7. The portion of the supervisory signal present at the first output of the repeater means 32 will be applied to the portion of the transmission path 54 for further transmission to the remaining portions of the PCM transmission system not shown herein.

In the description of the operation of the instant example of the supervisory apparatus, the mode of operation thereof was considered wherein the operation of the repeater means 22 was supervised or monitored. However, as will be readily understood by those of ordinary skill in the art, the operation of any of the repeater means 11–13, 21–23 and 31–33 illustrated in the portion of the PCM transmission system depicted in FIG. 1 may be readily supervised or monitored by the application of a unipolar supervisory signal containing the appropriate frequency component $F_1$–$F_3$, as assigned to the repeater station 1–3 in which the repeater means 11–13, 21–23 and 31–33 to be supervised resides, to the transmission path 4–6 connected to said repeater means 11–13, 21–23 and 31–33 to be supervised. Furthermore, the above-described operation of the supervisory apparatus illustrated in FIG. 1, assumed for the purposes of explanation that when the repeater means 22 was being monitored or supervised, the repeater means 12 and 32, which are associated with the same transmission path 5 as the repeater means 22, were operating in a normal condition. If this assumption should prove erroneous with respect to the repeater means 32, the supervision operation of the supervisory apparatus with respect to the monitoring of the operation of the repeater means 22 will remain the same as outlined above; however, the supervisory signal applied to the transmission path 5 will not be properly retransmitted by the repeater means 32. Under these circumstances, the detection of a fault or failure in the operation of the repeater means 32 would of necessity await the supervision of the operation of the repeater means 32 by the application of a unipolar supervisory signal containing a specific frequency component $F_3$ to the transmission path 5. However, if the assumption as to normal operation of repeater means 12 and 32 should prove false as regards the operation of the repeater means 12, no proper supervisory signal will be applied to the repeater means 22, whose operation is to be supervised, from the first output of the repeater means 12 through the portion of the transmission path 52 interposed therebetween. As no proper supervisory signal containing the assigned frequency component $F_2$ is received by the repeater means 22, no such proper supervisory signal will be present at the second output thereof or applied to the supervisory circuit means 24 present at the repeater station 2 and connected to the second outputs of the repeater means 21–23. Thus, under these conditions, the supervisory circuit means 24 will apply no output signal to the supervisory transmission path 7 and thus an absence of the frequency component $F_2$ and hence a failure or fault in the operation of the repeater means 22 will be erroneously indicated by the detector means 9. This erroneous indication of the location of an improperly operating repeater means by the present supervisory apparatus will not, however, prove detrimental as upon the detection of a failure or fault condition in a remotely located repeater means 22, the normal supervisory procedure contemplated by supervisory apparatus according to this system would be to supervise the operation of repeater means located in the same transmission path 5 as where the fault had been detected but, positioned closer to the end portion of the PCM transmission system where the supervisory signals are applied, if such preceding repeater means were not previously supervised. Accordingly, the supervision of the operation of the nearest repeater means to the supervisory signal generator means 8, along a common transmission path, in which a failure or faulty operating condition is detected will result in an indication of the true location of the repeater means in which a fault or failure has occurred. Therefore, it will be seen that the supervisory apparatus according to the present system acts in a positive manner to monitor the operation of each of the repeater means 11–13, 21–23 and 31–33 present in the PCM transmission system illustrated in FIG. 1.

As was mentioned above, PCM transmission systems employing a unipolar differential code as the transmitting code format include in the transmitted signal components which clearly reside in the low-frequency region. Thus, the supervisory signal utilized to monitor or supervise the operation of the repeater means 11–13, 21–23 and 31–33, as illustrated in FIG. 1, and provided by the supervisory signal-generating means 8 of the supervisory apparatus is a unipolar signal of the differential code type characterized in that it comprises the requisite specific frequency component assigned to a given repeater station and may be readily varied to comprise other specific frequency components assigned to other repeater stations present in a PCM transmission system. The waveform of one such unipolar signal of the differential code type which may be relied upon as the supervisory signal generated by the supervisory signal generating means 8 to monitor or supervise the operation of the repeater means 11–13, 21–23 and 31–33 illustrated in FIG. 1 as specifically shown in FIG. 2B while an ordinary unipolar signal which corresponds to the binary information present in the waveform of FIG. 2B is illustrated in FIG. 2A. The unipolar signal of the differential code type illustrated in FIG. 2B corresponds to the waveform illustrated in FIG. 2A in that the direction of the unipolar signal of FIG. 2B changes each time a unipolar information pulse, representing a given information bit, a "1" or a "0", occurs in the unipolar waveform of FIG. 2A. As may be seen by an inspection of the waveform illustrated in FIG. 2B, the supervisory signal takes one of two binary states alternately, wherein one state may be considered as present between times $t_1$ and $t_2$ and the other of said states may be considered as present between times $t_2$ and $t_3$. However, as plainly indicated in FIG. 2B, the duration of each of said states is not equal as the interval between times $t_1$ and $t_2$ is substantially larger than the interval between times $t_2$ and $t_3$. The waveform of the supervisory signal illustrated in FIG. 2B is then formed by repeating the alternating states, indicated between times $t_1$ and $t_3$ a select number of times, as indicated between times $t_1$ and $t_4$, and then reversing the relative ratio between each of said states, as indicated between times $t_4$ and $t_5$ and repeating this sequence of pulses a select number of times, indicated between time $t_4$ and $t_6$, equal to the initially repeated sequence such that the time interval between $t_1$ and $t_4$ is equal to the time interval between $t_4$ and $t_6$. Thus, one cycle of the supervisory signal in the form of a unipolar signal of the differential code type is completed and may be considered to reside between times $t_1$ and $t_6$. Thereafter, succeeding cycles of the supervisory signal are formed in the same manner set forth for the initial cycle, residing between times $t_1$ and $t_6$, as described above. The supervisory signal in the form of a unipolar signal of the differential code type illustrated in FIG. 2B has a specific frequency component which is illustrated in FIG. 2C. This specific frequency component of the supervisory signal, as illustrated in FIG. 2C, is strictly dependent on the cycle time of the supervisory signal illustrated in FIG. 2B; consequently, the specific frequency component may be easily and readily changed by merely increasing or decreasing the number of repetitions of the alternating states prior to the reversal of the duration ratio thereof for the second half of the cycle which is the same as increasing or decreasing, respectively, the cycle time. Accordingly, if the waveform illustrated in FIG. 2B is relied upon as the supervisory signal for the supervisory apparatus as illustrated in conjunction with FIG. 1, any one of the supervisory circuit means 14, 24 and 34 illustrated therein may comprise filter means which may pass only a predetermined frequency component wherein each of said supervisory circuit means 14, 24 and 34 may pass one of the specific frequency components for which said supervisory signal may be varied to embody. Thus, it will be seen that the supervisory apparatus, as disclosed herein, may use a supervisory signal in the form of a unipolar signal of the differential code type illustrated in FIG. 2B and thereby accomplish the monitoring or supervision of the repeater means present in a PCM transmission system using a unipolar differential code format without the usual discrimination or detection difficulties normally incurred with the supervision of repeater means due to low-frequency components associated with unipolar code formats.

The waveform of a novel unipolar signal of the differential code type which may be utilized as the supervisory signal generated by the supervisory signal-generating means 8 according to the invention, to thus monitor or supervise the operation of the repeater means 11–13, 21–23 and 31–33, is shown in FIG. 3A. The waveform of the supervisory signal depicted in FIG. 3A comprises a first portion formed by two cycles of the unipolar signal of the differential code type described in conjunction with FIG. 2B wherein the duration of the pulses of different binary states are unequal and the sequence is repeated at a frequency $F_1$, and a second portion comprising pulses representative of first and second binary states wherein the pulses representing each such binary state are of equal duration. Thus, if a supervisory signal having the waveform illustrated in FIG. 3A was to be relied upon in the supervisory apparatus according to the present invention, the supervisory signalugenerating means 8 would generate two cycles of the unipolar signal of the differential code type described in conjunction with FIG. 2B during the period $T_1$ and thereafter complete the cycle of the waveform illustrated in FIG. 3A by generating a plurality of pulses of alternating binary states which are equal in duration during the period $T_2$. Subsequently, additional cycles of the unipolar signal of the differential code type illustrated in FIG. 3A are formed by repeating the two portions of the waveform whose periods are $T_1$ and $T_2$ alternately. Accordingly, the repetition frequency $F_2$ of the waveform of the supervisory signal illustrated in FIG. 3A may be expressed as $F_{2m} = 1/(T_1 + T_2)$, where $m$ is a positive integer.

The mean value of the slowly varying frequency component of the supervisory signal depicted in FIG. 3A is shown for the purposes of illustration as a rectangular waveform in FIG. 3B. Since, in the period $T_1$, the duration of the pulses representing the two binary states of the unipolar signal of the differential code type are unequal, a slowly varying frequency component is produced during the period $T_1$ whose positive and negative components are governed by the relative ratios of the duration of the pulses representing the binary states of said unipolar signal of the differential code type. Thus, during the interval of the waveform depicted in FIG. 3A between $t_1$ and $t_2$, a negative portion of the rectangular waveform is produced, between $t_2$ and $t_3$ a positive portion of the rectangular waveform is produced, between $t_3$ and $t_4$ a negative portion of the rectangular waveform is produced and between $t_4$ and $t_5$ a positive portion of the rectangular waveform is produced. Furthermore, because the duration of the pulses representing different binary states is unequal and reversed each half cycle, the cycle sequence being repeated at a frequency $F_1$, during the period $T_1$ the rectangular waveform illustrated in FIG. 3B will have a predetermined frequency $F_1$. However, during the period $T_2$, as the duration of each of the binary pulses illustrated during this interval in FIG. 3A are equal, the mean value of the slowly varying frequency component thereof will be zero. Thus, the waveform in FIG. 3B representing the slowly varying frequency components of the supervisory signal illustrated in FIG. 3A will comprise a rectangular waveform having a predetermined frequency component $F_1$ during the period $T_1$ and a zero component during the period $T_2$, where the $F_1$ frequency component may be varied in the manner described in conjunction with FIGS. 2B and 2C. Therefore, if the waveform illustrated in FIG. 3B is rectified, it will be apparent that the periodic signal whose frequency is $F_{2m}$, as represented in FIG. 3C, will be obtained after such rectification.

As will be appreciated from the discussion of the waveform illustrated in FIG. 3C, the supervisory signal shown in FIG. 3A contains a plurality of frequency components such as $F_1$, $F_{2m}$, $F_1 \pm F_{2m}$, etc., which may be represented in general form as the expression $p\ F_1 \pm r\ F_{2m}$, where $p$ and $n$ are zero or arbitrary positive integers. Thus, when the supervisory signal illustrated in FIG. 3A is generated by the supervisory signal generator means 9 shown in FIG. 1, one of the supervisory circuit means 14, 24 and 34 of the supervisory apparatus according to the present invention may take the form of band-pass filter means having a passband equal to $F_1 \pm F_{2m}$, for example, a rectifying circuit means adapted to receive the output thereof, and an additional filter means adapted to pass a frequency component $F_{2m}$ present in the thus rectified output. Similarly, the other supervisory circuit means may take the same form as said one of said supervisory circuit means 14, 24 and 34 wherein the pass frequencies of the filter means present therein are varied such that other frequency components present in the supervisory signal may be selectively passed. An exemplary embodiment of this form of the instant invention has been illustrated in FIG. 4. As the embodiment of the invention illustrated in FIG. 4 corresponds to the exemplary system shown in FIG. 1 except for the substitution of a conventional band-pass filter means 141, 241 and 341, a conventional rectifying circuit means 142, 242 and 342 and a conventional additional filter means 143, 243 and 343, as aforesaid, for the supervisory circuit means 14, 24 and 34, respectively; previously utilized reference numerals have been used throughout to identify corresponding structure and it will be appreciated that such corresponding structure takes the same form, performs the same function and admits of the same variations as that mentioned in the description of FIG. 1 but operates in conjunction with supervisory signals of the form described in connection with FIG. 3A. Accordingly, it will be seen that in the embodiment of the supervisory apparatus according to the present invention disclosed herein the supervisory signal illustrated in FIG. 3A may be relied upon to accomplish the monitoring or supervision of repeater means present in a PCM transmission system using a unipolar code format without incurring any discrimination problems normally associated with the supervision of such repeater means.

As will be obvious to those of ordinary skill in the art, the exemplary supervisory signal illustrated in FIG. 3A will provide for more discrete assignable frequencies having better frequency discrimination characteristics for the supervision of independent repeater means than the supervisory signal illustrated in FIG. 2 because such discrete assignable frequencies will be formed of combinations of two separate frequencies $F_1$ and $F_{2m}$. Accordingly, when the supervisory apparatus according to the present invention is to be utilized in conjunction with a PCM transmission system having a large number of repeater stations, the supervisory signal illustrated in FIG. 3A will be preferred.

While the invention has been described in connection with an exemplary embodiment thereof, it will be understood that many modifications will be readily apparent to those of ordinary skill in the art; and that this application is intended to cover any adaptations or variations thereof.

What is claimed is:

1. In a PCM transmission system including at least one information transmission path, repeater means disposed at preselected intervals along said at least one information transmission path and supervisory apparatus for determining the operating condition of said repeater means, the improvement in said supervisory apparatus for a PCM transmission system adapted for the transmission of a unipolar differential binary signal whose value is changed from one state to another state in response to the presence of a given bit of information in an original information carrying binary code sequence, comprising:

means for selectively applying a unipolar supervisory signal including at least two slowly varying frequency components to said at least one information transmission path, said unipolar supervisory signal being binary in nature and characterized by a waveform having a first portion in which the duration of a segment of the waveform representing one binary state substantially exceeds the duration of a segment of the waveform representing another binary state, a second portion in which the duration of a segment of the waveform representing said another binary state substantially exceeds the duration of a segment of the waveform representing said one binary state, and a third portion in which the duration of a segment of the waveform representing said one binary state is substantially equal to the duration of a segment of the waveform representing said another binary state, whereby said at least two slowly varying frequency components in said waveform are formed;

supervisory transmission path means adapted for the transmission of specifically assigned frequency components from each of said repeater means to a terminal portion of said PCM transmission system, said terminal portion being disposed at that end of said supervisory transmission path means at which said unipolar supervisory signal applying means is located;

a plurality of frequency-selective supervisory circuit means, each of said plurality of frequency-selective supervisory circuit means being electrically interposed between one of said repeater means disposed along said at least one information transmission path and said supervisory transmission path means, said plurality of frequency-selective supervisory circuit means each including means for passing to said supervisory transmission path means only a frequency component specifically assigned to the repeater means connected thereto, at least one slowly varying frequency component of said at least two slowly varying frequency components present in said unipolar supervisory signal being specifically assigned to one of said repeater means; and detector means coupled to said supervisory transmission path means at said terminal portion of said PCM transmission system, said detector means acting to determine the presence in said supervisory transmission path means of frequency components specifically assigned to each of said repeater means.

2. The improved supervisory apparatus according to claim 1 wherein said first, second and third waveform portions each include a plurality of segments representative of each of said binary states.

3. The improved supervisory apparatus according to claim 2 wherein said waveform of said unipolar supervisory signal comprises said first, second and third portions in an alternating sequence.

4. The improved supervisory apparatus according to claim 2 wherein said waveform of said unipolar supervisory signal comprises a plurality of said first and second portions followed by a third portion.

5. The improved supervisory apparatus according to claim 3 wherein said means for passing only a frequency component specifically assigned to the repeater means connected thereto in each of said plurality of frequency-selective supervisory circuit means includes rectifier means.

6. The improved supervisory apparatus according to claim 4 wherein said means for passing only a frequency component specifically assigned to the repeater means connected thereto in each of said plurality of frequency-selective supervisory circuit means includes band-pass filter means, rectifier means and filter means serially connected in the order named.

7. The improved supervisory apparatus according to claim 6 wherein said PCM transmission system additionally comprises a plurality of information transmission paths having repeater means disposed at preselected intervals therein, each of said plurality of information transmission paths and said at least one information transmission path having commonly positioned repeater means spaced therealong, said commonly positioned repeater means in each of said information transmission paths having a common frequency component specifically assigned thereto and being formed into repeater stations, and each of said repeater stations thus formed including therein one of said plurality of frequency-selective supervisory circuit means connected to an output of each of the repeater means present therein.

* * * * *